United States Patent
Zhang et al.

(10) Patent No.: US 11,014,028 B2
(45) Date of Patent: May 25, 2021

(54) METHOD FOR PREPARATION AND ACTIVATION OF SUPER-HYDROPHOBIC ELECTRET FIBER MATERIAL FOR CLEANING PM2.5

(71) Applicant: South China University of Technology, Guangzhou (CN)

(72) Inventors: Lizhi Zhang, Guangzhou (CN); Aibing Bao, Guangzhou (CN); Rongrong Cai, Guangzhou (CN)

(73) Assignee: South China University of Technology

( * ) Notice: Subject to any disclaimer, the term of this patent is extended or adjusted under 35 U.S.C. 154(b) by 284 days.

(21) Appl. No.: 16/300,168

(22) PCT Filed: Sep. 10, 2016

(86) PCT No.: PCT/CN2016/098632
§ 371 (c)(1),
(2) Date: Nov. 9, 2018

(87) PCT Pub. No.: WO2017/197812
PCT Pub. Date: Nov. 23, 2017

(65) Prior Publication Data
US 2019/0143254 A1   May 16, 2019

(30) Foreign Application Priority Data

May 17, 2016   (CN) .......................... 201610329607.3

(51) Int. Cl.
*B08B 5/02*   (2006.01)
*B08B 6/00*   (2006.01)
(Continued)

(52) U.S. Cl.
CPC ..... *B01D 39/1623* (2013.01); *B01D 46/0067* (2013.01); *B01D 46/0068* (2013.01);
(Continued)

(58) Field of Classification Search
CPC ............ B01D 46/0067; B01D 46/0068; B01D 46/0078; B08B 5/02; B08B 6/00;
(Continued)

(56) References Cited

U.S. PATENT DOCUMENTS 6,063,150 A * 5/2000 Peter .................. B01D 46/0063
55/282.3
8,153,702 B2 4/2012 Knorr et al.
(Continued)

FOREIGN PATENT DOCUMENTS

CN       101777425 A    7/2010
CN       101905101 A    12/2010
(Continued)

*Primary Examiner* — Leo B Tentoni
(74) *Attorney, Agent, or Firm* — The Webb Law Firm (57) ABSTRACT

Disclosed is a method for preparation and activation of a super hydrophobic electret nanofibrous filter material for cleaning PM2.5, comprising the steps as follows: (1) dissolving polymer powders and resin into a corresponding solvent so as to prepare a polymer solution, then stirring on a magnetic stirrer and standing for use; (2) in order to reinforce the electrostatic effect of the fiber, before preparing the polymer solution, adding in organic electret nanoparticles into the solvent, then oscillating with an ultrasonic oscillator; (3) in order to reinforce the super hydrophobic effect of the filter, spraying a low surface energy solution on the prepared nanofiber with a designed nozzle to carry out modification.

9 Claims, 2 Drawing Sheets

Diagram of electrostatic spinning apparatus.

(51) Int. Cl.

| | | |
|---|---|---|
| *D01F 1/09* | (2006.01) | |
| *D01F 6/10* | (2006.01) | |
| *D01F 6/18* | (2006.01) | |
| *D01F 6/22* | (2006.01) | |
| *D01F 6/64* | (2006.01) | |
| *D01F 6/70* | (2006.01) | |
| *D01F 6/74* | (2006.01) | |
| *D01F 11/04* | (2006.01) | |
| *D06B 1/02* | (2006.01) | |
| *D06M 11/01* | (2006.01) | |
| *D06M 13/188* | (2006.01) | |
| *B01D 39/16* | (2006.01) | |
| *C08J 3/09* | (2006.01) | |
| *B29C 71/00* | (2006.01) | |
| *B01D 46/00* | (2006.01) | |
| *C08J 3/20* | (2006.01) | |
| *D01D 5/00* | (2006.01) | |
| *B29K 27/06* | (2006.01) | |
| *B29K 25/00* | (2006.01) | |
| *B29K 27/00* | (2006.01) | |
| *B29L 31/14* | (2006.01) | |
| *B29K 105/00* | (2006.01) | |
| *B29K 69/00* | (2006.01) | |
| *B29K 79/00* | (2006.01) | |
| *B29K 75/00* | (2006.01) | |
| *B29K 33/20* | (2006.01) | |

(52) U.S. Cl.
CPC ...... *B01D 46/0078* (2013.01); *B29C 71/0009* (2013.01); *B29C 71/0081* (2013.01); *C08J 3/093* (2013.01); *C08J 3/095* (2013.01); *C08J 3/097* (2013.01); *C08J 3/203* (2013.01); *D01D 5/0038* (2013.01); *B01D 2239/025* (2013.01); *B01D 2239/0428* (2013.01); *B01D 2239/0435* (2013.01); *B01D 2239/10* (2013.01); *B29K 2025/06* (2013.01); *B29K 2027/06* (2013.01); *B29K 2027/16* (2013.01); *B29K 2033/20* (2013.01); *B29K 2069/00* (2013.01); *B29K 2075/00* (2013.01); *B29K 2079/085* (2013.01); *B29K 2105/002* (2013.01); *B29K 2105/0023* (2013.01); *B29K 2995/0093* (2013.01); *B29L 2031/14* (2013.01); *D06M 2200/12* (2013.01); *D10B 2321/041* (2013.01); *D10B 2321/042* (2013.01); *D10B 2321/10* (2013.01); *D10B 2321/121* (2013.01); *D10B 2331/04* (2013.01); *D10B 2331/10* (2013.01); *D10B 2331/14* (2013.01); *D10B 2401/021* (2013.01); *D10B 2505/04* (2013.01)

(58) Field of Classification Search
CPC ............ B29C 71/0009; B29C 71/0081; B29K 2025/06; B29K 2027/06; B29K 2027/16; B29K 2033/20; B29K 2069/00; B29K 2075/00; B29K 2079/085; B29K 2105/002; B29K 2105/0023; B29K 2995/0993; B29L 2031/14; C08J 3/093; C08J 3/095; C08J 3/097; C08J 3/203; D01D 5/003; D01D 5/0038; D01F 1/09; D01F 6/10; D01F 6/18; D01F 6/22; D01F 6/64; D01F 6/70; D01F 6/74; D01F 11/04; D06B 1/02; D06M 11/01; D06M 13/188; D06M 2200/12; D10B 2321/041; D10B 2321/10; D10B 2321/121; D10B 2331/10; D10B 2331/14; D10B 2401/021; D10B 2505/04
USPC ........... 264/10, 211, 331.11, 331.12, 331.14, 264/331.15, 331.16, 331.19, 464, 465, 264/466, 484; 8/115.62, 115.68; 95/278, 95/279; 134/1, 34, 37
See application file for complete search history.

(56) References Cited

U.S. PATENT DOCUMENTS

| | | | |
|---|---|---|---|
| 8,871,011 B2 | 10/2014 | Veeser et al. | |
| 2004/0102614 A1* | 5/2004 | Islam | D01F 4/00 530/353 |
| 2006/0094320 A1* | 5/2006 | Chen | D04H 1/4391 442/340 |
| 2010/0018641 A1* | 1/2010 | Branham | D01D 5/0038 264/466 X |
| 2011/0092652 A1* | 4/2011 | Voit | C08G 18/4833 525/328.4 |
| 2013/0122773 A1* | 5/2013 | Wahal | B29C 48/05 442/400 |
| 2015/0101979 A1* | 4/2015 | Joo | D01F 4/00 264/484 X |
| 2015/0107457 A1 | 4/2015 | Huang et al. | |

FOREIGN PATENT DOCUMENTS

| | | |
|---|---|---|
| CN | 102159295 A | 8/2011 |
| CN | 103938432 A | 7/2014 |
| CN | 104289042 A | 1/2015 |
| CN | 104480423 A | 4/2015 |
| CN | 104759162 A | 7/2015 |
| CN | 104785018 A | 7/2015 |
| JP | 2006291045 A | 10/2006 |

\* cited by examiner

Figure 1. Diagram of electrostatic spinning apparatus.

Figure 2. Diagram of low surface energy solution nozzle.

Figure 3. Diagram of filter material regeneration apparatus.

METHOD FOR PREPARATION AND ACTIVATION OF SUPER-HYDROPHOBIC ELECTRET FIBER MATERIAL FOR CLEANING PM2.5

CROSS-REFERENCE TO RELATED APPLICATIONS

This application is the United States national phase of International Application No. PCT/CN2016/098632 filed Sep. 10, 2016, and claims priority to Chinese Patent Application No. 201610329607.3 filed May 17, 2016, the disclosures of each of which are hereby incorporated by reference in their entireties.

FIELD OF THE INVENTION

The present invention relates to a method for preparation and activation a super-hydrophobic electret nanofibrous filter material for cleaning PM2.5, and belongs to the field of air cleaning and indoor air quality.

BACKGROUND OF THE INVENTION

High-performance electret filter material for cleaning PM2.5 is not only required to have the characteristics of high efficiency and low resistance, but also required to hold a surface charge for a long time in humid air. The traditional electret filter materials for cleaning PM2.5 are all hydrophilic materials, which are not carried out a surface treatment, so that the surface potential will be decayed and eventually disappear after using a period of time. In addition, after the surface potential is decayed, the traditional electret filter material for cleaning PM2.5 will be significantly dropped in the filtration performance, and the re-production of the filter material will directly lead to the increased production cost. Accordingly, the present invention provides a super-hydrophobic electret for cleaning PM2.5, which not only can make the filter material hold charge in humid air and increase the filtration efficiency, but also can make the filter material cleaned and regenerated via a high-voltage electric field when the filter material reaches saturation in cleaning PM2.5 particle, thus achieving a long-term and high-efficient cleaning of the fiber material for PM2.5.

At present, the studies of the electret air-filtering material are mainly focused on the method for preparing the electret of the filter material, which mainly employs two modes of corona discharge and thermal polarization. Although the electret fibrous filter material having desirable effects can be prepared with the two modes, the disadvantages are obvious, such as unstable electret properties, easy to charge decay, complex device, and high cost. The invention patent CN101905101A disclosed on Dec. 8, 2010 in China describes a method for preparing a meltblown polypropylene electret filter material, which comprises extruding ultrafine fiber via a high-speed hot air, then corona decharging to prepare electrets, and in turn prepare an electret material. Although the prepared electret has a high efficiency, the resistance is high and the potential decay is fast. The invention patent US2015/0107457A1 disclosed on Apr. 23, 2015 in USA, describes that a fibrous material is prepared by a centrifugal device, and prepared an electret by corona decharging, and the prepared fibrous electret has the characteristics of high efficiency and low resistance, but the apparatus is too complicated and the cost is high. The electric potential of the electret fibrous filter material is greatly influenced by the environments, for example, in humid air in southern China, such as in the region of Guangdong, the electric potential will be rapidly decayed and disappear, which greatly reduces the efficiency and service life of the filter material. The invention patent CN104289042A disclosed on Jan. 21, 2015 in China, describes a method for preparing an electret nanofiber material by electrostatic spinning. The fiber prepared with this method has high filtration effect, but the cleaning and regeneration of the filter material are not mentioned, so that the filter material can not work for a long time.

SUMMARY OF THE INVENTION

In some examples, a method for preparing and activating a super-hydrophobic electret nanofibrous material for high-efficient cleaning PM2.5 particulate matter is provided, wherein the method comprises: preparing a nanofibrous material by an electrostatic spinning method, wherein the spinning material comprises polyvinylidene fluoride, polyvinyl chloride, polyacrylonitrile, polycarbonate, polyetherimide, polystyrene, polyurethane, or mixtures thereof; and in order to reinforce the electrostatic effect of the nanofiber layer, adding inorganic electret nanoparticles into the spinning solution, wherein the inorganic electret nanoparticle comprises silicon dioxide, titanium dioxide, barium titanate, silicon nitride, or mixtures thereof; and spraying the prepared nanofiber with a low surface energy solution from a designed nozzle, wherein the low surface energy solution comprises stearic acid solution, hexadecyltrimethoxysilane solution, 1H,1H,2H,2H-perfluorohydrocarbyltriethoxysilane solution, 1H,1H,2H,2H-perfluorohydrocarbyltrichlorosilane solution,—or mixtures thereof.

The object of the present invention is to overcome the deficiencies and disadvantages in the prior art and provide a super-hydrophobic electret nanofibrous filter material for cleaning PM2.5. The filter material is prepared by an electrostatic spinning method, comprising the steps of:

(1) preparation of polymer solution: 0.5-5 wt. % of one or more types of inorganic electret nanoparticles are added into a solvent, ultrasonically oscillated for 1-5 hr, then added 5-25 wt. % of polymer, stirred on a magnetic stirrer for 6-12 h, and stood for use.

(2) electrostatic spinning: a non-woven fabric is pasted onto a rotating drum receiver, and adjusted the electrostatic spinning parameters to control the morphology of the electret nanofiber, with process conditions for electrostatic spinning as follows: the electric voltage is 10-30 kV, the receiving distance is 5-25 cm, the injection speed is 1-5 mL/h, the temperature is 0-35° C., and the relative humidity is 0-70%.

(3) preparation of low surface energy solution: a low surface energy solution is prepared with methanol or anhydrous ethanol, with a volume ratio of the solute to the solvent in the low surface energy solution of 1:1000.

(4) spraying: a low surface energy solution is sprayed with a designed nozzle to carry out surface modification, wherein the nozzle is composed of a sampling barrel, a nitrogen bottle, a gas pipe, a gas control knob, a liquid control knob, and an injection needle; and the spraying time is 1-3 s.

The spinning material comprises polyvinylidene fluoride, polyvinyl chloride, polyacrylonitrile, polycarbonate, polyetherimide, polystyrene, polyurethane, and the like.

The inorganic electret nanoparticle comprises silicon dioxide, titanium dioxide, barium titanate, silicon nitride, and the like.

The low surface energy solution comprises stearic acid solution, hexadecyltrimethoxysilane solution, 1H,1H,2H, 2H-perfluorohydrocarbyltriethoxysilane solution, 1H,1H, 2H,2H-perfluorohydrocarbyltrichlorosilane solution, and the like.

Another object of the present invention is to achieve the cleaning and regeneration of the filter material, so as to achieve the long-term and high-efficiency cleaning of the filter material for PM2.5. The cleaning and regeneration processes comprise the steps as follows:

(1) cleaning: when the filter material reaches saturation in cleaning PM2.5 particle, the filter material is removed, then placed in a high-voltage electric field as a barrier medium, applied a high-voltage having the same charge as that of the particle, and achieved the cleaning effect due to the repulsive interaction with the particle charge; and in order to improve the cleaning effect, at the same time carried out purging, wherein during the cleaning process, the high voltage is 5-15 kV; the electrode type is plate; the area is equivalent to the area of the fiber material, the distance between the positive electrode and the negative electrode is 10-50 mm; and the processing time is not less than 5 s.

(2) spraying: a low surface energy solution is sprayed with a designed nozzle to carry out surface modification, wherein the nozzle is composed of a sampling barrel, a nitrogen bottle, a gas pipe, a gas control knob, a liquid control knob, and an injection needle; and the spraying time is 1-3 s.

(3) regeneration: the sprayed filter material is placed in a high-voltage electric field as a barrier medium again, and the positive electrode and the negative electrode in the high-voltage electric field are reversed to carry out a high-voltage charged processing, so that the filter material is recharged to carry out a cleaning operation, wherein during the regeneration process, the high-voltage is 5-15 kV and the processing time is not less than 5 s.

The super-hydrophobic electret nanofibrous filter material for cleaning PM2.5 described in the present invention is prepared by an electrostatic spinning method, wherein the method is feasible, the operation is simple, the prepared filter material can be widely used in the field of air cleaning, indoor air quality, individual protective mask filter, and high/ultra-high efficiency air filter, and the like.

As compared with the prior art, the present invention has the beneficial effects as follows:

(1) the preparation of the super-hydrophobic electret nanofiber comprises two stages—electrostatic spinning and spraying a low surface energy liquid, the preparation method is simple, and when cleaning PM2.5 particle, the prepared electret fiber not only has the characteristics of high efficiency and low resistance, but also has the super-hydrophobic effect, and can hold a surface potential for a long time in humid air. Due to the super-hydrophobic effect, the super-hydrophobic electret nanofiber can effectively inhibit the growth of bacteria and microorganisms on the filter material, so as to protect the filter material.

(2) The invention also relates to the cleaning and regeneration of the electret fiber, which increases the durability of the electret filter material, so as to achieve the long-term and high-efficient cleaning of the filter material for PM2.5.

DESCRIPTION OF THE DRAWINGS

FIG. 1 is a diagram showing an electrostatic spinning apparatus. A non-woven fabric is pasted onto a rotating drum receiver 2; 1 is the electric motor of the rotating drum receiver; 3 is the injection system of the electrostatic spinning apparatus, which is composed of a syringe and an push injector; and 4 is an electrostatic high-voltage supply system. After the high-voltage is applied, the syringe is pushed by the push injector, and a nanofiber is ejected from the syringe, and received on the rotating drum receiver.

FIG. 2 is a diagram showing a low surface energy solution nozzle. 10 is a high-pressure nitrogen bottle, the nitrogen bottle is opened, the pressure at the gas outlet is controlled via a control valve 9, the gas flow is further controlled via a gas control knob 8, a low surface energy solution is poured into a sampling barrel 5, the low surface energy liquid flow is controlled via a liquid control knob 6, and a liquid is ejected from a nozzle 7 after these controls are finished.

DETAILED DESCRIPTION

The method for preparation and activation of the super-hydrophobic electret nanofibrous filter material for cleaning PM2.5 is described in detail below in combination with the drawings.

Figure 1:
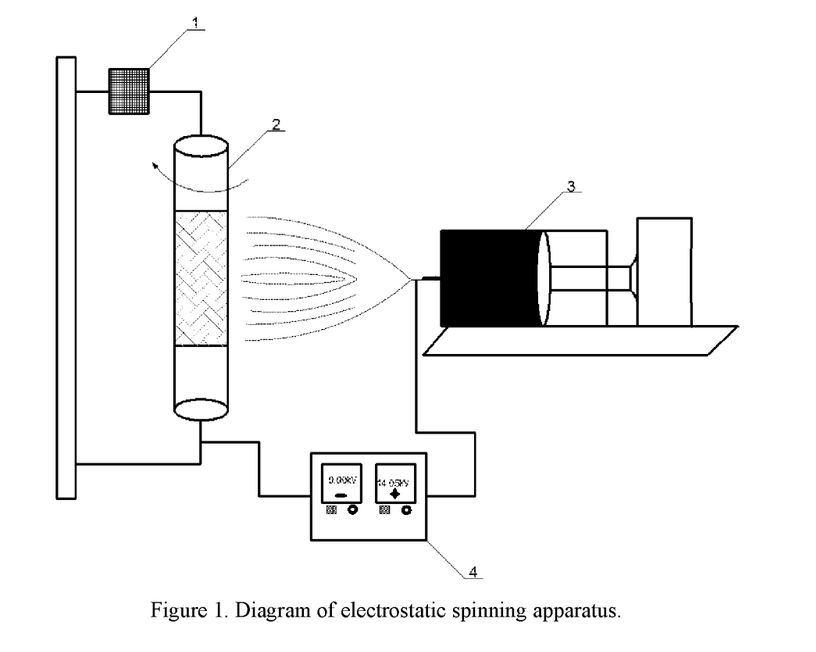

FIG. 1 is a diagram showing an electrostatic spinning apparatus. A non-woven fabric is pasted onto a rotating drum receiver 2; 1 is the electric motor of the rotating drum receiver; 3 is the injection system of the electrostatic spinning apparatus, which is composed of a syringe and an push injector; and 4 is an electrostatic high-voltage supply system. After the high-voltage is applied, the syringe is pushed by the push injector, and a nanofiber is ejected from the syringe, and received on the rotating drum receiver.

Figure 2:
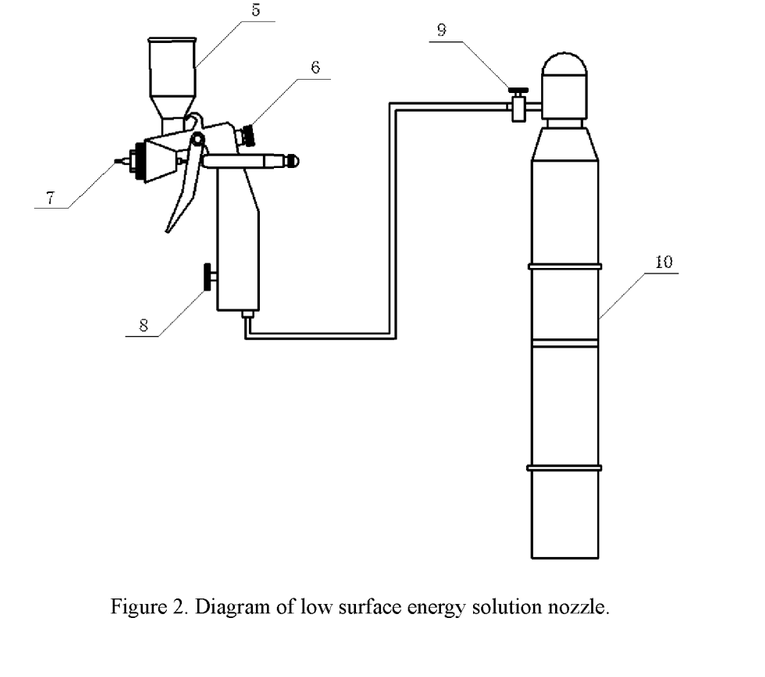

FIG. 2 is a diagram showing a low surface energy solution nozzle. 10 is a high-pressure nitrogen bottle, the nitrogen bottle is opened, the pressure at the gas outlet is controlled via a control valve 9, the gas flow is further controlled via a gas control knob 8, a low surface energy solution is poured into a sampling barrel 5, the low surface energy liquid flow is controlled via a liquid control knob 6, and a liquid is ejected from a nozzle 7 after these controls are finished.

Figure 3:
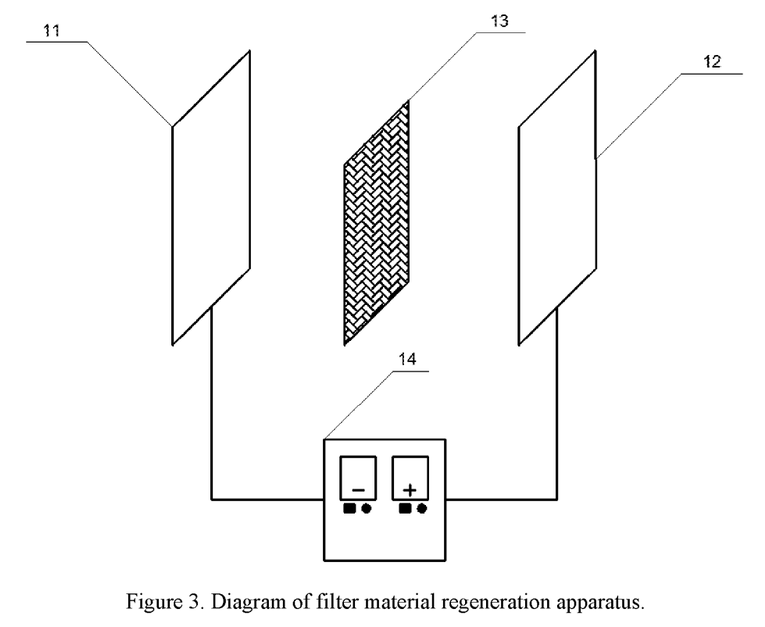
FIG. 3 is a diagram showing a filter material regeneration apparatus. The filter material 13 is placed in a high-voltage electric field via a clamping tool, and the filter material is carried out a charge regeneration between the positive electrode plate 12 and the negative electrode plate 11, by regulating the high-voltage regulator 14.

FIG. 3 is a diagram showing a filter material regeneration apparatus. The filter material 13 is placed in a high-voltage electric field via a clamping tool, and the filter material is carried out a charge regeneration between the positive electrode plate 12 and the negative electrode plate 11, by regulating the high-voltage regulator 14.

Example 1

A method for preparation and activation of a super-hydrophobic electret nanofibrous filter material for cleaning PM2.5, comprises the steps of:

step 1: polyvinyl chloride powders are placed in a vacuum oven at 60° C. and dried for 2 h.

step 2: 10.875 g of N,N-dimethylformamide and 10.875 g of tetrahydrofuran are accurately weighed with an electronic balance, and placed in a 50 mL beaker, then 0.25 g of silicon dioxide is weighed, and placed in the solution, oscillated with an ultrasonic oscillator for 1 h, the beaker is removed, then 3 g dried polyvinyl chloride powders are accurately weighed with an electronic balance, and placed in the beaker, the beaker is placed on a magnetic stirrer and stirred for 6 hr, so as to prepare an uniform and stable solution;

step 3: the electrostatic apparatus as shown in FIG. 1 is used to spin, a well-cut non-woven fabric is pasted onto the rotating drum, and the electrostatic spinning parameters are adjusted as follows: the receiving speed of the rotating drum is 25 r/min; the translation speed of the injection device is 60 mm/min; the receiving distance is 15 cm; the electrostatic high-voltage is 15 kV; and the injection speed is 1 mL/h step 4: preparation of low surface energy solution: 100 mL of anhydrous ethanol is accurately metered, added 6 drops of 1H,1H,2H,2H-perfluorohydrocarbyltriethoxysilane, and stood for 2 hr. The prepared solution is poured into a spraying device as shown in FIG. 2, then the surface of the electret fiber is modified with the low surface energy solution, and the spraying time is 3 s.

step 5: the nanofiber layer in the prepared super-hydrophobic electret material for cleaning PM2.5 has a diameter of 200-600 nm, grams per square meter of 2 g/m$^2$, a surface electrostatic potential of 3500V, a filtration efficiency for the particle with a diameter of 0.3 μm of 99.01%, a pressure drop of 18 Pa and a hydrophobic angle of 152°.

step 6: when the super-hydrophobic electret material reaches saturation in cleaning PM2.5 particle, the electret filter material is removed, and cleaned and regenerated in the high-voltage electric field as shown in FIG. 3. Firstly, a high-voltage having the same charge as that of the particle is applied, wherein the electric potential is 10 KV, the distance between the positive electrode and the negative electrode is 20 mm, and the processing time is 10 s; the particle will be shed from the filter material due to the repulsive effect, thus achieving the cleaning of the filter material. In order to improve the cleaning effect, at the same time ventilation and purging are carried out. The cleaned filter material is sprayed with the apparatus as shown in FIG. 2, with a spraying time of 3 s. After the spraying is finished, the filter material is placed in a high-voltage electric field again, and the positive electrode and the negative electrode in the high-voltage electric field are reversed, likewise, the high-voltage electric voltage is 10 kV; the distance between the positive electrode and the negative electrode is 20 mm; the processing time is 10 s, after the regeneration is finished, the cleaning operation is carried out again.

Example 2

A method for preparation and activation of a super-hydrophobic electret nanofibrous filter material for cleaning PM2.5, comprises the steps of:

step 1: polyvinylidene fluoride powders are placed in a vacuum oven at 60° C. and dried for 2 h.

step 2: 9 g of N,N-dimethylformamide and 9 g of butanone are accurately weighed with an electronic balance, and placed in a 50 mL beaker, then 0.2 g of barium titanate is weighed, and placed in the solution, oscillated with an ultrasonic oscillator for 2 h, the beaker is removed, then 2 g dried polyvinylidene fluoride powders are accurately weighed with an electronic balance, and placed in the beaker, the beaker is placed on a magnetic stirrer and stirred for 6 hr, so as to prepare an uniform and stable solution;

step 3: the electrostatic apparatus as shown in FIG. 1 is used to spin, and a well-cut non-woven fabric is pasted onto the rotating drum, and the electrostatic spinning parameters are adjusted as follows: the receiving speed of the rotating drum is 25 r/min; the translation speed of the injection device is 60 mm/min; the receiving distance is 12 cm; the electrostatic high-voltage is 15 kV; and the injection speed is 1 mL/h step 4: preparation of low surface energy solution: 100 mL of methanol is accurately metered, added 6 drops of hexadecyltrimethoxy silane, and stood for 2 hr. The prepared solution is poured into a spraying device as shown in FIG. 2, then the surface of the electret fiber is modified with the low surface energy solution, and the spraying time is 3 s.

step 5: the nanofiber layer in the prepared super-hydrophobic electret material for cleaning PM2.5 has a diameter of 100-500 nm, grams per square meter of 2.75 g/m$^2$, a surface electrostatic potential of 2900V, a filtration efficiency for the particles with a diameter of 0.3 μm of 99.56%, a pressure drop of 16 Pa and a hydrophobic angle of 154°.

step 6: when the super-hydrophobic electret material reaches saturation in cleaning PM2.5 particle, the electret filter material is removed, and cleaned and regenerated in the high-voltage electric field as shown in FIG. 3. Firstly, a high-voltage having the same charge as that of the particle is applied, wherein the electric potential is 12 KV, the distance between the positive electrode and the negative electrode is 30 mm, and the processing time is 8 S, the particle will be shed from the filter material due to the repulsive effect, thus achieving the cleaning of the filter material. In order to improve the cleaning effect, at the same time ventilation and purging are carried out. The cleaned filter material is sprayed again with the apparatus as shown in FIG. 2, with a spraying time of 3 s. After the spraying is finished, the filter material is placed in a high voltage electric field again, and the positive electrode and the negative electrode in the high-voltage electric field are reversed, likewise, the high-voltage electric voltage is 12 KV, the distance between the positive electrode and the negative electrode is 30 mm, the processing time is 8 s; after the regeneration is finished, the cleaning operation is carried out again.

Example 3

A method for preparation and activation of a super-hydrophobic electret nanofibrous filter material for cleaning PM2.5, comprises the steps of:

step 1: polyacrylonitrile resin is placed in a vacuum oven at 60° C. and dried for 2 h.

step 2: 26.7 g of N,N-dimethylformamide is accurately weighed with an electronic balance, and placed in a 50 mL beaker, then 0.3 g of silicon nitride is weighed, and placed in the solution, oscillated with an ultrasonic oscillator for 2 h, the beaker is removed, then 3.3 g dried polyacrylonitrile powders are accurately weighed with an electronic balance, and placed in the beaker, the beaker is placed on a magnetic stirrer and stirred for 8 hr, so as to prepare an uniform and stable solution;

step 3: the electrostatic apparatus as shown in FIG. 1 is used to spin, a well-cut non-woven fabric is pasted onto a rotating drum, and the electrostatic spinning parameters are adjusted as follows: the receiving speed of the rotating drum is 25 r/min; the translation speed of the injection device is 60 mm/min; the receiving distance is 20 cm; the electrostatic high-voltage is 20 KV; and the injection speed is 1 mL/h step 4: preparation of low surface energy solution: 100 mL of methanol is accurately metered, added 6 drops of stearic acid, and stood for 2 hr. The prepared solution is poured into a spraying device as shown in FIG. 2, then the surface of the electret fiber is modified with the low surface energy solution, and the spraying time is 3 s.

step 5: the nanofiber layer in the prepared super-hydrophobic electret material for cleaning PM2.5 has a diameter of 200-600 nm, grams per square meter of 3.25 g/m$^2$, a surface electrostatic potential of 3100V, a filtration efficiency for the particles with a diameter of 0.3 μm of 99.67%, a pressure drop of 18 Pa and a hydrophobic angle of 151°.

step 6: when the super-hydrophobic electret material reaches saturation in cleaning PM2.5 particle, the electret filter material is removed, and cleaned and regenerated in the high-voltage electric field as shown in FIG. 3. Firstly, a high-voltage having the same charge as that of the particle is applied, wherein the electric potential is 18 KV, the distance between the positive electrode and the negative electrode is 25 mm, and the processing time is 8 S; the particle will be shed from the filter material due to the repulsive effect, thus achieving the cleaning of the filter material. In order to improve the cleaning effect, at the same time ventilation and purging are carried out. The cleaned filter material is sprayed again with the apparatus as shown in FIG. 2, with a spraying time of 3 s. After the spraying is finished, the filter material is placed in a high-voltage electric field again, and the positive electrode and the negative electrode in the high-voltage electric field are reversed, likewise, the high-voltage electric voltage is 18 KV, the distance between the positive electrode and the negative electrode is 25 mm, the processing time is 8 s; and after the regeneration is finished, the cleaning operation is carried out again.

Example 4

A method for preparation and activation of a super-hydrophobic electret nanofibrous filter material for cleaning PM2.5, comprises the steps of:

step 1: polycarbonate powders are placed in a vacuum oven at 60° C. and dried for 2 h.

step 2: 27 g of dichloromethane is accurately weighed with an electronic balance, and placed in a 50 mL beaker, then 0.3 g of titanium dioxide is weighed, and placed in the solution, oscillated with an ultrasonic oscillator for 3 h, the beaker is removed, then 3 g dried polycarbonate powders are accurately weighed with an electronic balance, and placed in the beaker, the beaker is placed on a magnetic stirrer and stirred for 6 hr, so as to prepare an uniform and stable solution;

step 3: the electrostatic apparatus as shown in FIG. 1 is used to spin, a well-cut non-woven fabric is pasted onto a rotating drum, and the electrostatic spinning parameters are adjusted as follows: the receiving speed of the rotating drum is 25 r/min; the translation speed of the injection device is 60 mm/min; the receiving distance is 18 cm; the electrostatic high-voltage is 18 KV; and the injection speed is 1 mL/h step 4: preparation of low surface energy solution: 100 mL of anhydrous ethanol is accurately metered, added 6 drops of 1H,1H,2H,2H-perfluorohydrocarbyltrichlorosilane, and stood for 2 hr. The prepared solution is poured into the spraying device as shown in FIG. 2, then the surface of the electret fiber is modified with the low surface energy solution, and the spraying time is 3 s.

step 5: the nanofiber layer in the prepared super-hydrophobic electret material for cleaning PM2.5 has a diameter of 100-400 nm, grams per square meter of 1.8 g/m$^2$, a surface electrostatic potential of 2500V, a filtration efficiency for the particles with a diameter of 0.3 μm of 99.46%, a pressure drop of 14 Pa and a hydrophobic angle of 156°.

step 6: when the super-hydrophobic electret material reaches saturation in cleaning PM2.5 particle, the electret filter material is removed, and cleaned and regenerated in the high-voltage electric field as shown in FIG. 3. Firstly, a high-voltage having the same charge as that of the particle is applied, wherein the electric potential is 15 KV, the distance between the positive electrode and the negative electrode is 40 mm, and the processing time is 10 S; the particle will be shed from the filter material due to the repulsive effect, thus achieving the cleaning of the filter material. In order to improve the cleaning effect, at the same time ventilation and purging are carried out. The cleaned filter material is sprayed again with the apparatus as shown in FIG. 2, with a spraying time of 3 s. After the spraying is finished, the filter material is placed in a high voltage electric field again, and the positive electrode and the negative electrode in the high-voltage electric field are reversed, likewise, the high-voltage electric voltage is 15 KV, the distance between the positive electrode and the negative electrode is 40 mm, the processing time is 8 s; and after the regeneration is finished, the cleaning operation is carried out again.

Example 5

A method for preparation and activation of a super-hydrophobic electret nanofibrous filter material for cleaning PM2.5, comprises the steps of:

step 1: polyetherimide powders are placed in a vacuum oven at 60° C. and dried for 2 h.

step 2: 10 g of N,N—N,N-dimethylformamide and 10 g of methyl pyrrolidone are accurately weighed with an electronic balance, and placed in a 50 mL beaker, then 0.25 g of silicon dioxide is weighed, and placed in the solution, oscillated with an ultrasonic oscillator for 3 h, the beaker is removed, then 5 g dried polyetherimide powders are accurately weighed with an electronic balance, and placed in the beaker, the beaker is placed on a magnetic stirrer and stirred for 6 hr, so as to prepare an uniform and stable solution;

step 3: the electrostatic apparatus as shown in FIG. 1 is used to spin, a well-cut non-woven fabric is pasted onto a rotating drum, and the electrostatic spinning parameters are adjusted as follows: the receiving speed of the rotating drum is 25 r/min; the translation speed of the injection device is 60 mm/min; the receiving distance is 15 cm; the electrostatic high-voltage is 20 KV; and the injection speed is 1 mL/h step 4: preparation of low surface energy solution: 100 mL of anhydrous ethanol is accurately metered, added 6 drops of 1H,1H,2H,2H-perfluorohydrocarbyltrichlorosilane, and stood for 2 hr. The prepared solution is poured into the spraying device as shown in FIG. 2, then the surface of the electret fiber is modified with the low surface energy solution, and the spraying time is 3 s.

step 5: the nanofiber layer in the prepared super-hydrophobic electret material for cleaning PM2.5 has a diameter of 300-800 nm, grams per square meter of 3.65 g/m$^2$, a surface electrostatic potential of 3000V, a filtration efficiency for the particles with a diameter of 0.3 μm of 99.23%, a pressure drop of 16 Pa and a hydrophobic angle of 153°.

step 6: when the super-hydrophobic electret material reaches saturation in cleaning PM2.5 particle, the electret filter material is removed, and cleaned and regenerated in the high-voltage electric field as shown in FIG. 3. Firstly, a high-voltage having the same charge as that of the particle is applied, wherein the electric potential is 15 KV, the distance between the positive electrode and the negative electrode is 15 mm, and the processing time is 20 S; the particle will be shed from the filter material due to the repulsive effect, thus achieving the cleaning of the filter material. In order to improve the cleaning effect, at the same time ventilation and purging are carried out. The cleaned filter material is sprayed again with the apparatus as shown in FIG. 2, with a spraying time of 3 s. After the spraying is finished, the filter material is placed in a high voltage electric field again, and the positive electrode and the negative electrode in the high-voltage electric field are reversed, likewise, the high-voltage electric voltage is 15 KV, the distance between the positive electrode and the negative electrode is 15 mm, and the processing time is 20 s; and after the regeneration is finished, the cleaning operation is carried out again.

The invention claimed is:

1. A method for preparing and activating a super-hydrophobic electret nanofibrous material for high-efficient cleaning PM2.5 particulate matter, wherein the method comprises:

preparing a nanofibrous material by an electrostatic spinning method, wherein the spinning material comprises polyvinylidene fluoride, polyvinyl chloride, polyacrylonitrile, polycarbonate, polyetherimide, polystyrene, polyurethane, or mixtures thereof; and in order to reinforce the electrostatic effect of the nanofiber layer, adding inorganic electret nanoparticles into the spinning solution, wherein the inorganic electret nanoparticle comprises silicon dioxide, titanium dioxide, barium titanate, silicon nitride, or mixtures thereof; and wherein solute and solvent in the low surface energy solution respectively comprise:

stearic acid:anhydrous ethanol; hexadecyltrimethoxysilane:methanol; 1H,1H,2H,2H-perfluorohydrocarbyltriethoxysilane:anhydrous ethanol; or 1H,1H,2H,2H-perfluorohydrocarbyltrichlorosilane:anhydrous ethanol;

spraying the prepared nanofiber with a low surface energy solution from a designed nozzle, wherein the low surface energy solution comprises stearic acid solution, hexadecyltrimethoxysilane solution, 1H,1H,2H,2H-perfluorohydrocarbyltriethoxysilane solution, 1H,1H,2H,2H-perfluorohydrocarbyltrichlorosilane solution, or mixtures thereof.

2. A method for preparing and activating a super-hydrophobic electret nanofibrous material for high-efficient cleaning PM2.5 particulate matter, wherein the method comprises: cleaning and regenerating filter material comprising PM2.5 particles by placing the filter material into a cleaning and regeneration apparatus comprising positive plate electrode, negative plate electrode, high-voltage generator, power supply, and nozzle and applying a high voltage having the same charge as the PM2.5 particles and purging the apparatus to remove the PM2.5 particles.

3. The method of claim 1, wherein the electrostatic spinning method comprises:

(1) preparing a polymer solution by adding 0.5-5 wt. % of one or more types of the inorganic electret nanoparticles into a solvent and ultrasonically oscillating the solution for 1-5 hr, adding 5-25 wt. % of polymer to the solution stirring the solution on a magnetic stirrer for 6-12 hr, and stood for use, (2) electrostatic spinning: pasting a non-woven fabric on a rotating drum receiver, adjusting the electrostatic spinning parameters to control the morphology of the electret nanofiber, wherein the process conditions for electrostatic spinning are as follows: the electric voltage is 10-30 kV, the receiving distance is 5-25 cm, the injection speed is 1-5 mL/h, the temperature is 0-35° C., and the relative humidity is 0-70%.

4. The method of claim 1, wherein the method for super-hydrophobization of the electret nanofiber layer comprises:

(1) preparing the low surface energy solution by mixing stearic acid solution, hexadecyltrimethoxysilane solution, 1H,1H,2H,2H-perfluorohydrocarbyltriethoxysilane solution, 1H,1H,2H,2H-perfluorohydrocarbyltrichlorosilane solution, or mixtures thereof as solute with methanol or anhydrous ethanol solvent, wherein the volume fraction of the solute to the solvent in the low surface energy solution is 1:1000, (2) spraying the low surface energy solution with a designed nozzle to carry out surface modification of the prepared nanofiber, wherein the nozzle is composed of a sampling barrel, a nitrogen bottle, a gas pipe, a gas control knob, a liquid control knob, and an injection needle, and the spraying time is 1-3 s.

5. The method of claim 2, wherein the method for cleaning and regeneration of the fiber material comprises:

(1) cleaning the fiber material saturated with PM2.5 particles by placing the fiber material in a high-voltage electric field as a barrier medium, applying a high-voltage having the same charge as the PM2.5 particles, and at the same time carrying out purging, thus due to the repulsive interaction with the particle charge, obtaining the cleaning effect, and the particulates being taken away with the purging gas; wherein during the cleaning process, the high-voltage is 5-15 kV, the electrode type is plate; the area is equivalent to the area of the fiber material, the distance between the positive electrode and the negative electrode is 10-50 mm; and the processing time is not less than 5 s, (2) spraying a low surface energy solution with a designed nozzle to carry out surface modification of the fiber material, wherein the nozzle comprises a sampling barrel, a nitrogen bottle, a gas pipe, a gas control knob, a liquid control knob, and an injection needle; and the spraying time is 1-3 s, (3) regenerating by placing the sprayed filter material in a high-voltage electric field as a barrier medium again, reversing the positive electrode and the negative electrode in the high-voltage electric field to carry out a high-voltage charged processing, so that the filter material is recharged, wherein during the regeneration process, the high-voltage is 5-15 kV and the processing time is not less than 5 s.

6. The method of claim 1, wherein solute and solvent in a polymer solution for use in the electrostatic spinning method respectively comprise:

polyvinylidene fluoride:N,N-dimethylformamide and butanone in a mass ratio of 1:1; polyvinyl chloride:N,N-dimethylformamide and tetrahydrofuran in a mass ratio of 1:1; polyacrylonitrile:N,N-dimethylformamide; polycarbonate:dichloromethane; polyetherimide: N,N-dimethylformamide and methyl pyrrolidone in a mass ratio of 1:1; polystyrene:N,N-dimethylformamide and tetrahydrofuran in a mass ratio of 3:1; or polyurethane:butanone.

7. The method of claim 1, wherein a polymer solution for use in the electrostatic spinning method comprises one or more types of inorganic electret nanoparticles, the inorganic electret nanoparticle comprising silicon dioxide, titanium dioxide, barium titanate, silicon nitride, or mixtures thereof, and the specification of the inorganic electret nanoparticle respectively comprises:

silicon dioxide: 99.5%, 15 nm; titanium dioxide: 99.8%, 40 nm; barium titanate: 99.9%, <100 nm; or silicon nitride: 95%, 85 nm.

8. The method of claim 1, wherein the filter material has a two-layer structure of non-woven fabric and super-hydrophobic electret nanofiber, the grams per square meter of the non-woven fabric is 100-350 g/m$^2$, the thickness is 1-10 mm, and the filtration efficiency of the blank non-woven fabric for small particle having a particle diameter of 0.3 µm is 13.47%.

9. The method of claim 1, wherein the filter material has a two-layer structure of non-woven fabric and super-hydrophobic electret nanofiber, the nanofiber layer has a nanofiber diameter between 100 nm and 900 nm, a grams per square meter of 0.01-5 g/m$^2$, a porosity of 85%, a surface potential of 1000V-4000V, a hydrophobic angle of more than 150°, a filtration efficiency for the particle having a particle diameter range of 0.3-10 µm of up to 99%, and a pressure drop of less than 20 Pa.

\* \* \* \* \*

UNITED STATES PATENT AND TRADEMARK OFFICE
CERTIFICATE OF CORRECTION

PATENT NO. : 11,014,028 B2
APPLICATION NO. : 16/300168
DATED : May 25, 2021
INVENTOR(S) : Lizhi Zhang et al.

It is certified that error appears in the above-identified patent and that said Letters Patent is hereby corrected as shown below:

On the Title Page

Item (73), Assignee, Line 1, after "Technology" insert -- , (CN) --

Item (57), Column 2, Abstract, Line 2, delete "super hydrophobic" and insert -- super-hydrophobic --

Item (57), Column 2, Abstract, Line 10, delete "super hydrophobic" and insert -- super-hydrophobic --

In the Claims

Column 11, Line 8, Claim 9, delete "85%," and insert -- ≥85%, --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*